(12) United States Patent
Shaffer et al.

(10) Patent No.: US 7,578,117 B2
(45) Date of Patent: Aug. 25, 2009

(54) FOOT ACTUATED HEIGHT ADJUSTMENT MECHANISM FOR A LAWNMOWER CUTTING DECK

(75) Inventors: Aaron D. Shaffer, Stow, OH (US); Jimmy N. Eavenson, Sr., Aurora, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 12/075,563

(22) Filed: Mar. 12, 2008

(65) Prior Publication Data

US 2008/0229725 A1    Sep. 25, 2008

Related U.S. Application Data

(60) Provisional application No. 60/919,012, filed on Mar. 20, 2007.

(51) Int. Cl.
*A01D 34/00* (2006.01)

(52) U.S. Cl. .................... 56/17.1; 56/DIG. 22

(58) Field of Classification Search ............ 56/14.7, 56/14.9, 15.3, 17.1, DIG. 14, DIG. 22
See application file for complete search history.

(56) References Cited

U.S. PATENT DOCUMENTS

| | | | |
|---|---|---|---|
| 3,784,247 A | 1/1974 | Mills | |
| 3,982,383 A | 9/1976 | Mott | |
| 4,030,561 A | 6/1977 | Hashimoto et al. | |
| 4,059,025 A | 11/1977 | Waack et al. | |
| 4,120,136 A | 10/1978 | Rose | |
| 4,283,965 A | 8/1981 | Hansen | |
| 4,869,057 A | 9/1989 | Siegrist | |
| 5,138,825 A | 8/1992 | Trefz et al. | |
| 5,231,891 A | 8/1993 | Morita et al. | |
| 5,351,467 A | 10/1994 | Trefz et al. | |
| 5,842,378 A | 12/1998 | Zellmer | |
| 6,065,274 A | 5/2000 | Laskowski et al. | |
| 6,129,370 A | 10/2000 | Hsich et al. | |
| 6,131,380 A | 10/2000 | Browning | |
| 6,312,352 B1 | 11/2001 | Holland et al. | |
| 6,427,430 B1 | 8/2002 | Swartzendruber | |
| 6,494,028 B2 | 12/2002 | Moore | |
| 6,588,188 B2 | 7/2003 | Dennis | |
| 6,837,032 B1 | 1/2005 | Swartzendruber et al. | |
| 6,868,658 B2 | 3/2005 | Velke et al. | |
| 6,889,489 B2 | 5/2005 | Fackrell et al. | |

(Continued)

FOREIGN PATENT DOCUMENTS

EP    1472927    11/2004

*Primary Examiner*—Alicia M Torres
(74) *Attorney, Agent, or Firm*—Wegman, Hessler & Vanderburg (57) ABSTRACT

A foot-actuated mower deck lift mechanism for a riding lawnmower comprising first and second foot pedals for adjusting the cutting height of the mower deck. The foot pedals are suitable for engagement by an operator's foot to raise, latch and lower the cutting deck. The first pedal is connected to a lift linkage to adjust the height of the cutting deck upon actuation of the first pedal by the operator's foot. The second pedal is configured to automatically latch the mower deck into a raised transport position when the first pedal is depressed a preset amount, and to unlatch the mower deck upon actuation by the operator's foot. An adjustable pin-actuated height index mechanism is implemented to provide a plurality of predetermined cutting heights for the mower deck.

4 Claims, 7 Drawing Sheets

U.S. PATENT DOCUMENTS

| | | |
|---|---|---|
| 7,013,626 B1 | 3/2006 | Strope |
| 7,051,499 B2 | 5/2006 | Goto et al. |
| 7,089,722 B2 | 8/2006 | Laskowski |
| 2002/0035825 A1 | 3/2002 | Swartzendruber |
| 2002/0088217 A1 | 7/2002 | Dennis |
| 2003/0094071 A1 | 5/2003 | Eavenson, Sr. et al. |

FOOT ACTUATED HEIGHT ADJUSTMENT MECHANISM FOR A LAWNMOWER CUTTING DECK

CROSS REFERENCE TO RELATED APPLICATIONS

This application claims the priority benefit of U.S. Provisional Patent Application Ser. No. 60/919,012 filed Mar. 20, 2007.

BACKGROUND OF THE INVENTION

1. Field of Invention

The present invention relates generally to the field of riding lawnmowers having height adjustable mower decks, and more particularly relates to a foot actuated two-pedal lift mechanism for adjusting the mower deck between a cutting and transport position.

2. Description of Related Art

Vegetation cutting implements such as mounted cutting decks are typically carried by riding mowers having structure allowing adjustment of those decks among a range of heights above ground level. Ordinarily, the range extends between a position at or below the lowest available cut height to a position at or above the highest available cut height. Adjustment above the cut height range into a transport position is favored to permit the deck to clear obstacles encountered while traveling across the ground.

Adjustment of the cutting decks is presently accomplished by various structures including hand operated levers and bars positioned in the vicinity of the mower's seating apparatus. It is also known to provide foot operated, foot and hand operated, and automatic adjustment means powered by electrical, hydraulic, or other power means. Hand operated structures typically require an operator to either push or pull on the levers or bars in order to adjust the height of the cutting deck. Exertion of force in either of these manners is often strenuous and tiring, requiring the user to gather a certain amount of upper body strength to obtain any adjustment of the deck, with results being that the force required to lift some implements via hand operated levers and linkages can be greater than levels desired for some users. Such exertion may cause an operator injury due to strain resulting from the operator being pulled from or out of the seating apparatus. To alleviate forces required to obtain adjustment of the mower deck, some hand operated linkage mechanisms are known to incorporate lift assist devices such as counterbalance springs to reduce the effective weight of the mower deck. However, such prior art devices typically comprise hand operated levers which are relatively long for increased leverage, and such hand operated levers are less than satisfactory because they tend to be intrusive into the operator zone.

Other attempts have been made to implement foot actuated pedal assemblies for use in adjusting the height of the mower deck relative to the mower frame. Systems have been provided which comprise foot and hand operated linkages which may be actuated by hand, by foot, or a combination of both hand and foot. Such systems have been known to provide foot operated pedals that are somewhat adjustable for the size of the operator; however, such assemblies typically require a hand operated component or other hardware which automatically locks the mower deck into a given position upon full forward extension of the foot pedal. Such prior art devices are also typically less than satisfactory in accommodating a wide variety of operator sizes and strengths, and such systems are limited because one or both hands are typically required to latch the mower deck into the desired cutting height and/or release the mechanism from the transport setting.

Prior art lifting devices have also been known to provide power-assisted lifting mechanisms comprising electric, hydraulic, or pneumatic motor driven pumps with cylinders or motor driven linear actuators to obtain adjustment of the mower deck. Although such systems may provide useful products, they typically function in conjunction with hand and/or foot operated mechanisms, and such power-assisted devices typically operate at speeds slower than most operators desire.

Accordingly, there is a need in the art for a mower deck lift mechanism that accommodates a variety of operator sizes, shapes, and strengths, which reduces potential for operator fatigue for operators with physical limitations, and which may be actuated without use of the operator's hands.

SUMMARY OF THE INVENTION

The present invention provides an improved foot actuated implement lift mechanism for a riding lawnmower. The implement lift mechanism comprises a first foot pedal pivotally coupled to a lift linkage for adjusting the height of the mower deck relative to the supporting frame of the lawnmower. The first pedal is suitable for engagement by an operator's foot to raise or lower the cutting deck relative to the frame, and a second pedal is provided to latch the cutting deck into a fully raised transport position. The second foot pedal is pivotally attached to the first pedal, and the second pedal is suitable for engagement by the operator's foot to unlatch the mower deck from the transport position, allowing the mower deck to be lowered into a predetermined cutting position. In one exemplary embodiment, the lift mechanism includes a set of counterbalance springs adapted to reduce the effective weight of the cutting deck, thereby reducing the forces required for actuation of the first and second foot pedals. A height adjustment index mechanism is implemented to provide a plurality of predetermined cutting heights for the mower deck.

These and other features and advantages of the present invention are illustrated in the accompanying drawings, and are more fully disclosed in the following detailed description.

BRIEF DESCRIPTION OF THE DRAWINGS

The structure, operation, and advantages of the presently disclosed embodiments of the invention will become apparent when consideration of the following description is taken in conjunction with the accompanying drawings, wherein.

DETAILED DESCRIPTION OF INVENTION

The invention will now be described in the following detailed description with reference to the drawings, wherein exemplary embodiments are described in detail to enable practice of the invention. Although the invention is described with reference to specific exemplary embodiments, it will be understood that the invention is not limited to these exemplary embodiments. To the contrary, the invention includes numerous alternatives, modifications, and equivalents as will become apparent from consideration of the following detailed description.

Figure 3:
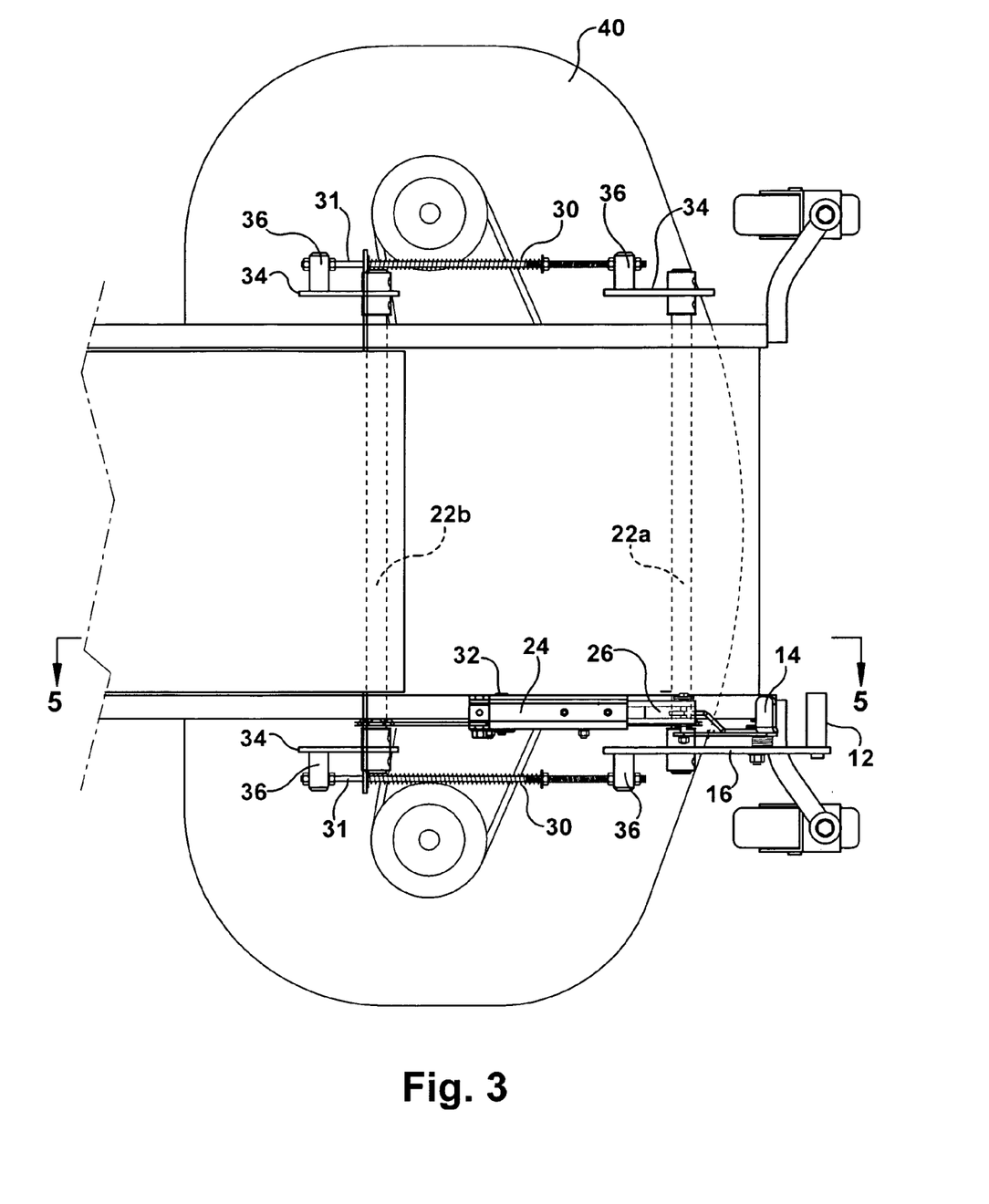
FIG. 3 is a top view of the two-pedal lift mechanism of FIG. 2.
Figure 4:
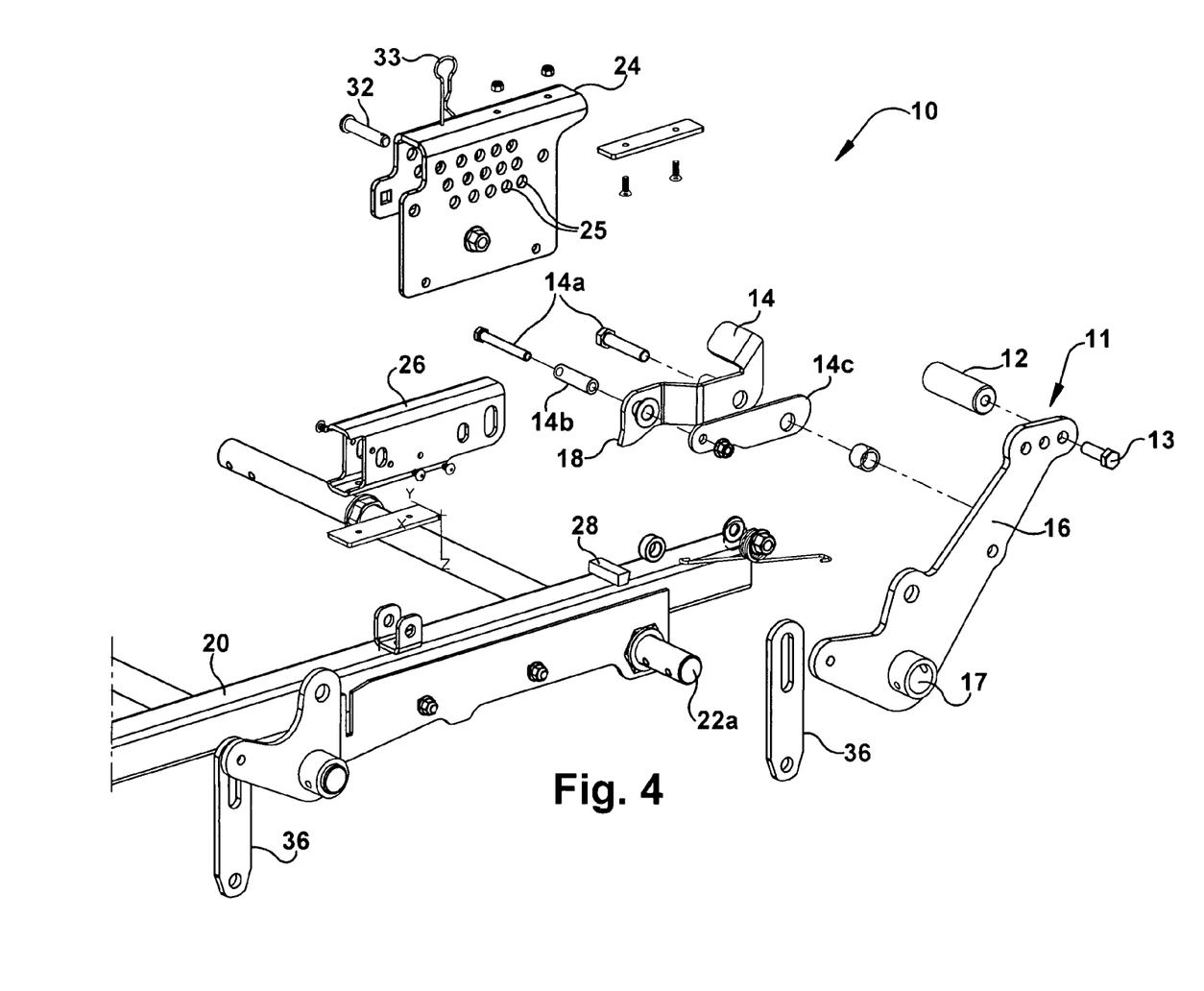
FIG. 4 is an isolated exploded view of the two-pedal lift mechanism of FIG. 1.
Figure 5:
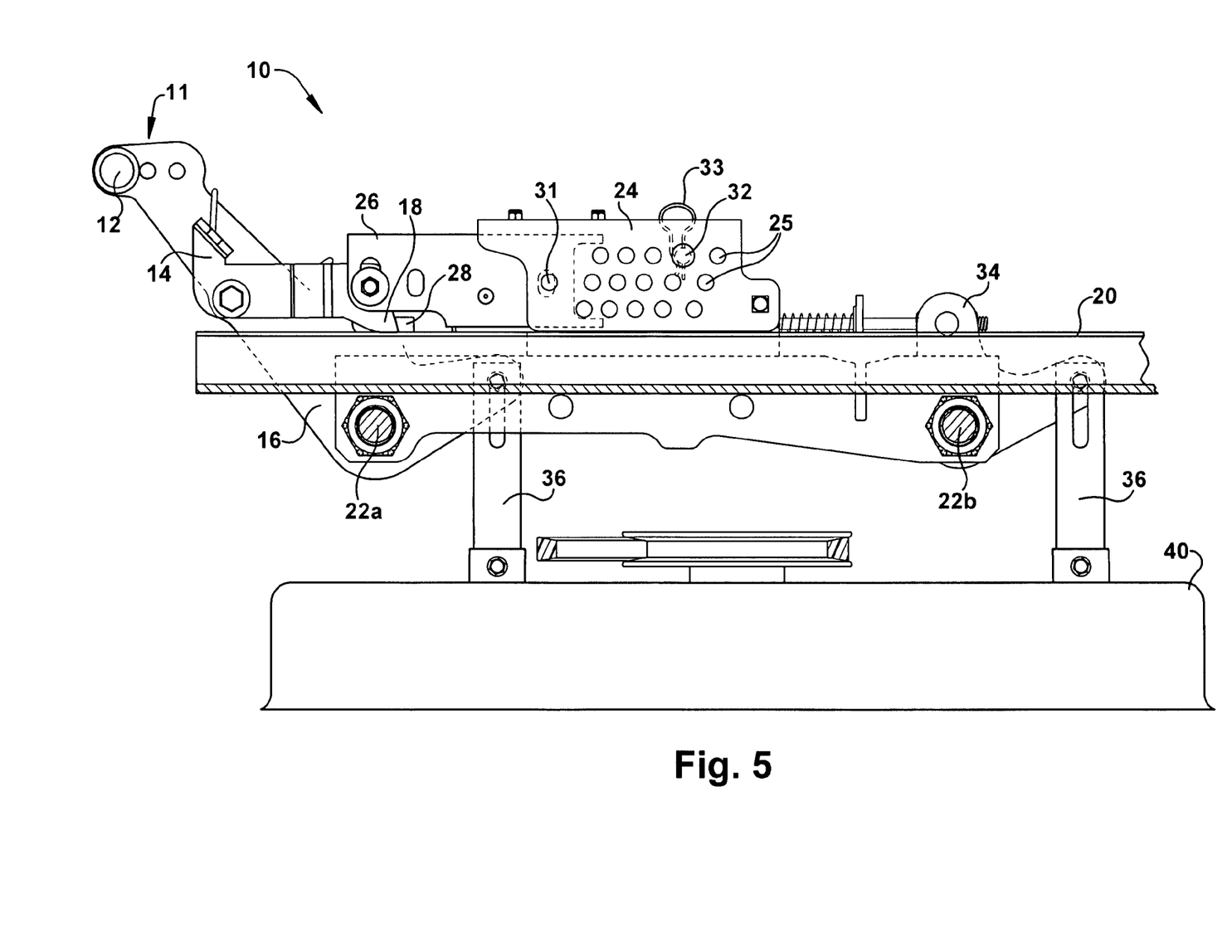
FIG. 5 is a side elevation view of the two-pedal lift mechanism illustrated in a raised transport position.

FIGS. 1-7 illustrate a two-pedal foot actuated mower deck lift mechanism 10 according to an exemplary embodiment of the present invention. The deck lift mechanism 10 comprises a first pedal 11, a second pedal 14, and a lift linkage apparatus connecting the mower deck 40 to the vehicle frame 20. The first pedal 11 comprises a foot rest 12 mounted to a pedal bracket 16 by way of a fastener such as a screw 13. The second pedal 14 is pivotally mounted to a mid-portion of the pedal bracket 16 by way of a fastener linkage comprising fasteners 14a, 14b, and bracket 14c so as to effect pivoting motion of the second pedal 14 relative to the pedal bracket 16. To latch the mower deck 40 into the raised transport position, the bottom end of the second pedal 14 is configured in the shape of a pawl 18, and a mating catch element 28 is provided on the top surface of the frame 20 as best shown in FIG. 5.

Figure 1:
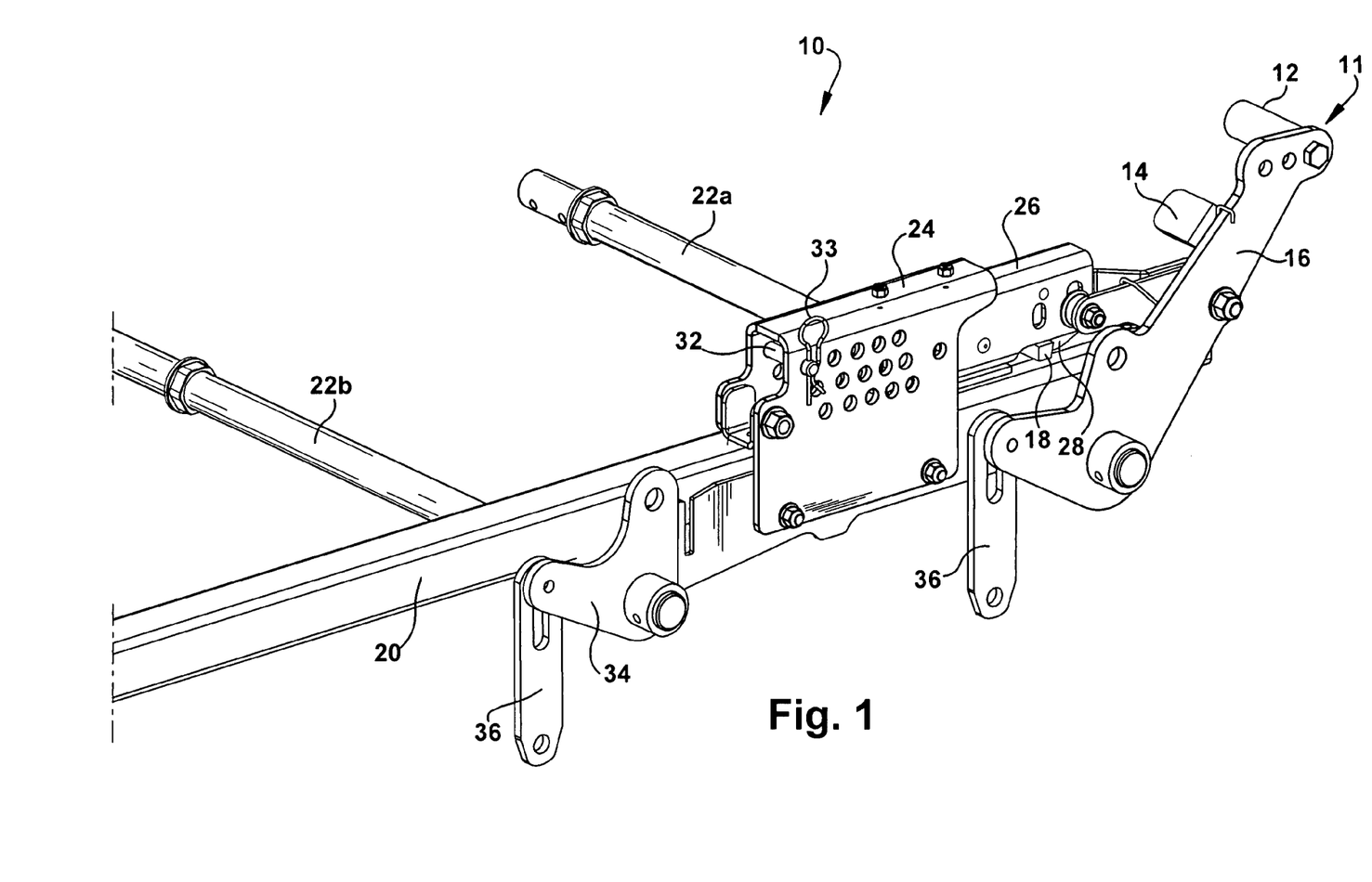
FIG. 1 is a perspective view of a two-pedal mower deck lift mechanism in accordance with an exemplary embodiment of the present invention.
Figure 2:
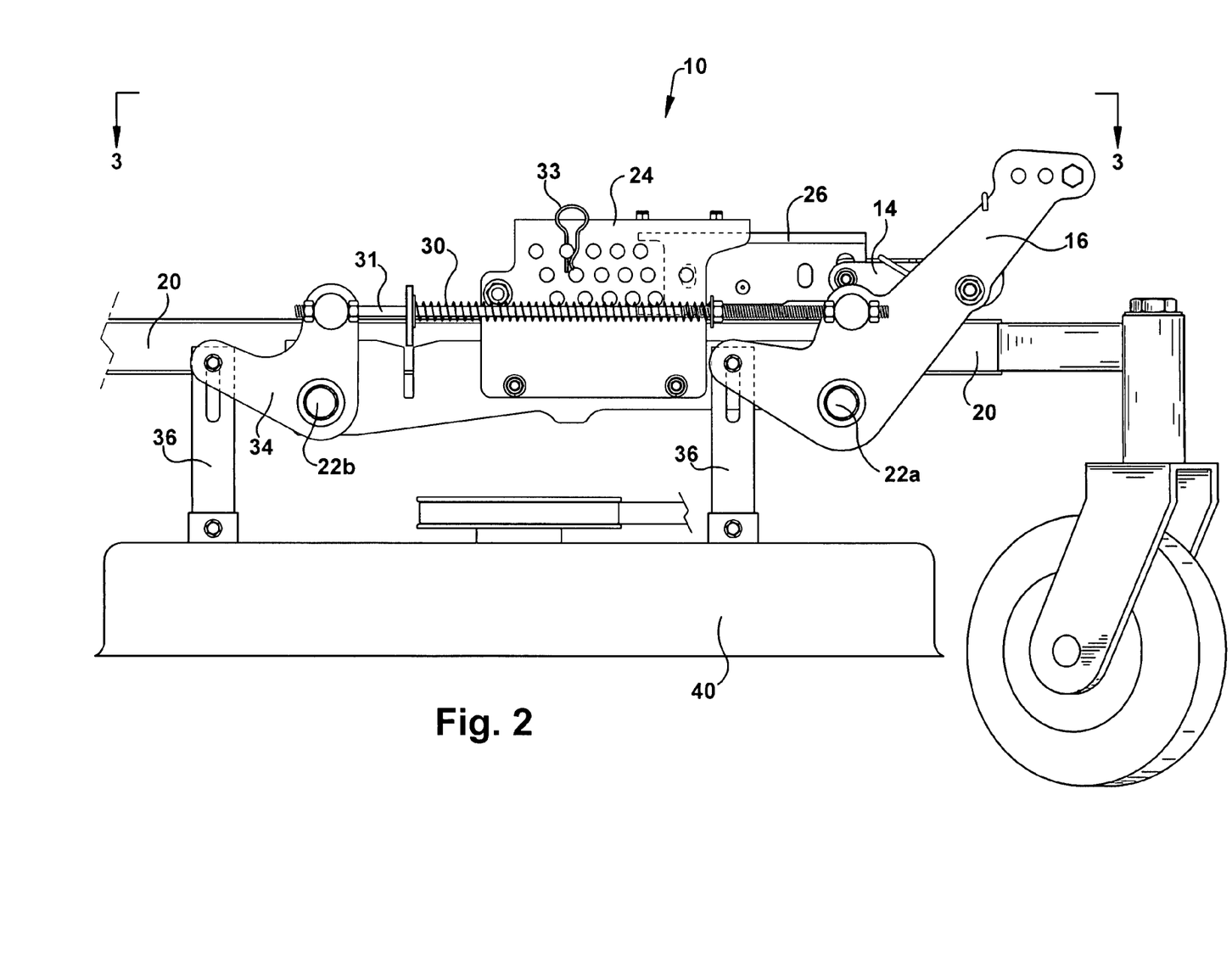
FIG. 2 is a partial elevation view of a riding lawnmower incorporating the two-pedal lift mechanism in accordance with an exemplary embodiment of the present invention.

Focusing on FIG. 4, the generally L-shaped pedal bracket 16 comprises an opening 17 configured to receive an end of the front lift shaft 22a. The lift shaft 22a thus defines an axis about which the pedal bracket 16 pivots. The bottom portion of the pedal bracket 16 is coupled to the vertically oriented riser plate 36, which in turn is coupled to the front right quadrant of the mower deck 40 as best shown in FIG. 2.

Referring to FIG. 3, the other three quadrants of the mower deck are similarly carried by vertically oriented riser plates 36 coupled to lift brackets 34, which in turn are connected to respective ends of the lift shafts 22a, 22b for effecting vertical movement of the mower deck 40 in response to actuation of first pedal 11. The lift link mechanism includes front and rear lift shafts 22a, 22b which extend the width of the cutting deck 40, and a pair of left and right perpendicularly oriented lift rods 31 which extend lengthwise along each side of the mower deck 40 between the ends of the lift shafts. The right lift rod 31 is coupled between the pivoting pedal bracket 16 and right rear lift bracket 34, and the left lift rod 31 is coupled between the left front and left rear lift brackets 34, respectively. As such, the lift shafts and rods are driven by the first pedal 11 to thereby transfer pivoting motion from the first foot pedal 11 to each of the four quadrants of the mower deck 40 and effecting vertical movement of the mower deck. A pair of counterbalance springs 30 are implemented in conjunction with the lift rods 31 so as to offset the gravitational weight of the cutting deck 40, thereby reducing the operating force required during activation of the foot pedals 11, 14.

Similar to the pedal bracket 16, the generally L-shaped lift brackets 34 each comprise an opening to receive a respective end of lift shaft 22a, 22b, thus defining axes about which the lift brackets 34 and pedal bracket 16 pivot in response to actuation of first pedal 11. As shown in FIGS. 2-3, the bottom end of each lift bracket 34 is coupled to an associated riser plate 36, which in turn are coupled to a respective quadrant of the mower deck 40 to effect vertical movement of the mower deck 40 relative to the frame 20 in response to actuation of first pedal 11. When first pedal 11 is depressed a preset amount, gravitational force acting on second pedal 14 causes pawl 18 to latch against catch 28, thereby latching the mower deck in the fully raised transport position.

Figure 6:
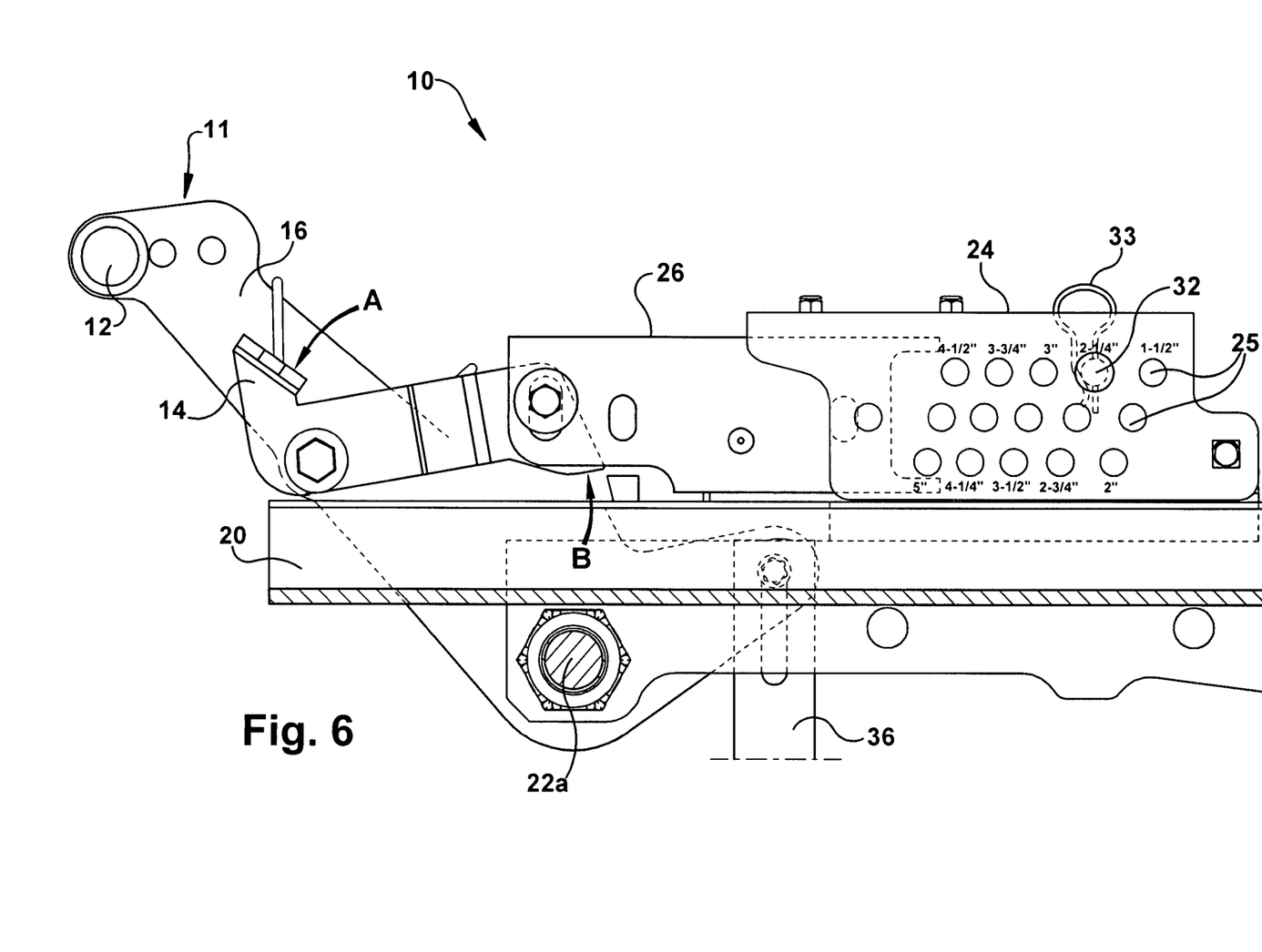
FIG. 6 is a side view of the two-pedal lift mechanism showing the second pedal latching arrangement in the unlatched position.
Figure 7:
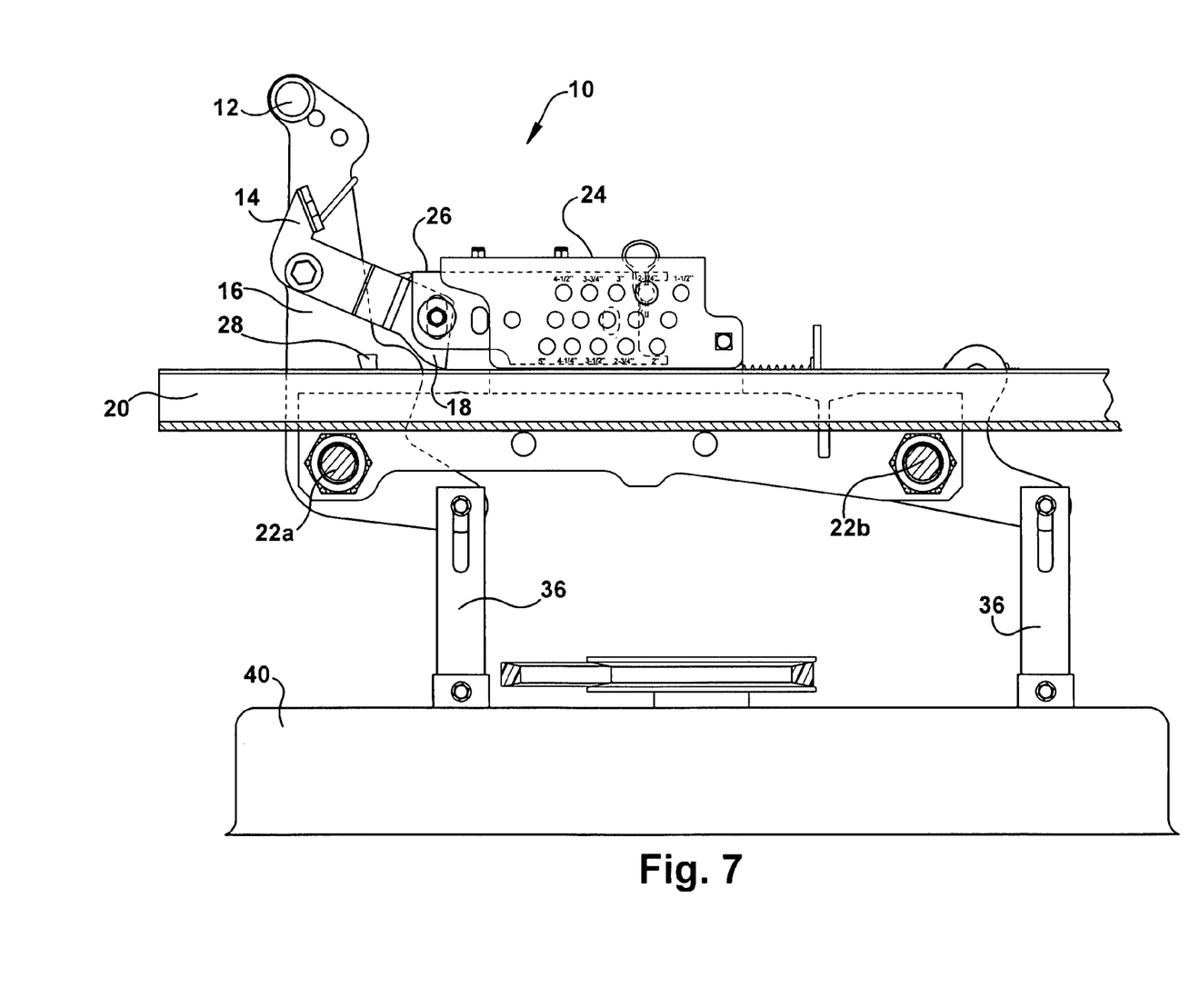
FIG. 7 is a side elevation view of the two-pedal lift mechanism illustrated in a lowered cutting position.

As best shown in FIGS. 5-7, and in order to provide a plurality of cutting heights for the mower deck, the lift mechanism 10 further comprises a height adjustment means comprising an index plate 24, index slide 26, index pin 32, and associated retaining clip 33. The generally U-shaped index plate 24 comprises an array of adjustment openings 25, each configured in shape and size to receive index pin 32 and retainer clip 33. The index slide 26 is adapted for sliding movement within the U-shaped opening of the index plate 24, and the index pin 32 functions as a positive stop limiting sliding movement of the index slide 26 within the index plate 24. With this arrangement, the operator may choose between a plurality of cut heights by selectively placing the index pin 32 and associated retainer clip 33 within one of the openings 25 of index plate 26. Depending on which opening 25 is chosen for pin 32 insertion determines how far the index slide 26 travels within the index plate 24. Since the front end of the second pedal 14 is attached to the pedal bracket 16 and the back end of the second pedal 14 is attached to the index slide 26, backward movement of the index slide 26 inside the index plate 24 determines how far the mower deck 40 will be lowered when second pedal 14 is depressed and pawl 18 is released.

In FIG. 5, the deck lift mechanism 10 is illustrated in the raised transport position wherein the first pedal 11 is placed in the fully forward position. In this position, the pawl 18 of second pedal 14 is latched against the mating catch 28 of the frame 20, thereby latching the mower deck 40 into the fully raised transport position.

As shown in FIG. 6, the operator may unlatch the mower deck by depressing the second pedal 14 in the direction of arrow A, thus releasing pawl 18 from the mating catch 28 in the direction of arrow B. Once pawl 18 is released from catch 28, gravitational forces acting on the mower deck will cause the first pedal 11 to pivot radially backward, thus causing the index slide 26 to move backward within the index plate 24. In this way, the mower deck 40 will be lowered until the index slide 26 reaches the positive stop defined by index pin 32 as shown in FIG. 7.

To place the mower deck 40 in the transport position, the operator places his/her right foot on the foot rest 12 of the first pedal 11, while wholly retaining his/her hands on the drive controls (not shown) and remaining seated on the vehicle seat (not shown). As the operator depresses the first pedal 11 with his/her foot, rotational movement of the front and rear lift shafts 22a, 22b in conjunction with the lateral movement of the horizontal lift rods 31 causes the associated lift brackets 34 to pivot radially upward. As a result, the mower deck 40, which is carried by the vertically oriented riser plates 36, is thereby lifted in response to forward actuation (i.e. depression) of first pedal 11. When first pedal 11 is depressed a preset amount, gravitational force acting on second pedal 14 causes pawl 18 to latch against catch 28, thereby latching the mower deck in the fully raised transport position. While the mower deck is raised, the operator's hands are free to adjust the cutting height of the mower deck by selectively inserting index pin 32 into a predetermined opening 25 of index plate 24, thereby limiting sliding motion of the index slide 26 within the index plate 24, and thus determining the overall cutting height for the mower deck. Also, while the mower deck is latched in the transport position (FIG. 5), the operator may insert a safety pin (not shown) through the aligned mating holes 31 of index plate 24 and index slide 26, thereby locking the mower deck in the transport position and preventing the mower deck from inadvertently being released from the transport position should second pedal 14 be accidentally depressed.

As best shown in FIG. 6, to release the mower deck from the transport position, the operator preferably places the heel of his/her right foot onto the second pedal 14 while retaining the rest of his/her foot on the first pedal 11. As the second pedal 14 is depressed by the heel of his/her foot in the direction of arrow A, pawl 18 is released from catch 28, and gravitational force causes the mower deck 40 to be lowered. Once the pawl 18 is released, the first pedal 11 will pivot backwards against the pressure of the operator's right foot until the index plate 26 reaches the positive stop defined by pin 32 of the index plate 24. As mentioned above, counterbalance springs 30 may be implemented to offset the gravitational weight of the mower deck, thereby reducing the operating force required by the operator's foot to smoothly and quickly raise or lower the mowing deck during pedal activation.

As described herein, the present invention thus provides a two-pedal mechanism whereby one pedal is used to raise and latch the cutting deck into a transport position, and a second pedal is used to unlatch the mechanism from the transport position while allowing the operator to maintain foot pressure against the first pedal to smoothly and quickly lower the cutting deck to a desired cutting height. The foot pedals 11, 14 may be used in conjunction with each other whereby the upper portion of the operator's foot activates the first pedal to raise or lower the cutting deck, and the lower portion of the operator's foot (heel) activates the second pedal to release the latch. The associated lift linkage is configured to connect the mower deck 40 to the vehicle frame 20 so as to raise and lower the mower deck in response to actuation of first pedal 11, and height adjustment index means comprising a pin or similar device provides a plurality of predetermined cutting heights for the mower deck.

The previously described versions of the present invention have many advantages, including allowing for some operators with physical limitations to easily adjust the cutting height of the mower deck without undo upper body strength, thereby minimizing operator injury due to strain resulting from the operator being pulled from or out of the seating apparatus. The present invention thus reduces potential for operator fatigue and accommodates a wide variety of operator sizes, shapes, and strengths. Moreover, adjustment of the mower deck may be obtained in a timely manner to improve efficiency of the cutting process. A further advantage of the present invention is that it does not require the use of the operator's hands (with the exception of resetting index pin 32) during normal machine operation.

In the exemplary embodiment described herein, the lift linkage comprises front and rear lift shafts 22a, 22b, lift brackets 34, riser plates 36, lift rods 31, and counter-balance springs 30 to effect and assist vertical motion of the mower deck 40 relative to the frame 20 in response to actuation of first pedal 11. It is noted, however, that the specific structure comprising the first linkage may be replaced by alternative structure presently existing or developed in the future such as electric, hydraulic, or pneumatic motor driven pumps with cylinders and/or motor driven linear actuators or other mechanical lifting means to obtain adjustment of the mower deck relative to the vehicle frame without departing from the scope of the present invention. Thus, unless expressly stated otherwise, each feature disclosed herein is but one example only of a generic series of equivalent or similar features which may be chosen with sound engineering judgment to achieve the same or similar results.

While the invention has been shown and described with respect to certain exemplary embodiments, it is apparent that equivalent alterations and modifications will occur to others skilled in the art upon reading and understanding of the specification. The present invention includes all such equivalent alterations and modifications and is limited only by the scope of the claims.

What is claimed is:

1. In a riding lawnmower having a mower deck and a frame, an apparatus for adjusting the height of the mower deck relative to the frame comprising:
   a lift linkage connecting the mower deck to the frame;
   a first pedal pivotally coupled to the lift linkage so as to raise the mower deck relative to the frame upon actuation of the first pedal by an operator's foot; and
   a second pedal pivotally coupled to the first pedal so as to latch the mower deck into a transport position when said first pedal is actuated a preset amount, and to unlatch the mower deck upon actuation of the second pedal by the operator's foot;
   wherein said frame comprises a catch and said second pedal comprises a pawl for latching the mower deck into the transport position;
   wherein the lift linkage comprises: front and rear lift shafts rotatably coupled to the frame, each shaft having a right and left end wherein the right end of the front lift shaft is coupled to the first pedal;
   a set of three pivot brackets, each bracket being coupled to the other ends of the lift shafts, respectively;
   a set of four riser plates, one of the plates being coupled between the mower deck and the first pedal, and the other plates being coupled between the mower deck and a respective pivot bracket;
   right and left lift rods oriented perpendicular to the front and rear lift shafts, the right lift rod being connected between the first pedal and the right rear pivot bracket, and the left lift rod being connected between the left front and left rear pivot brackets;
   whereby, upon actuation of the first pedal by the operator's foot, the lift linkage translates pivoting movement of the first pedal to effect vertical movement of the associated mower deck;
   whereby, upon depression of the first pedal to a preset position, gravitational force acting on the second pedal causes the pawl to engage the catch, thereby latching the mower deck in the transport position; and
   whereby, upon depression of the second pedal by the operator's foot, the pawl is released from the catch, thereby releasing the mower deck from the transport position.

2. The apparatus of claim 1, further comprising a height adjustment index means for providing a plurality of cutting heights for the mower deck, whereby upon depression of the second pedal by the operator's foot, gravitational force causes the mower deck to be lowered to a predetermined cut height.

3. The apparatus of claim 2, wherein said height adjustment index means comprises:
   an index pin;
   an index plate comprising a plurality of cross-holes adapted for receipt of said index pin;
   an index slide connected to said second pedal and configured for sliding movement within the index plate; and
   whereby upon insertion of the index pin into a selected cross-hole, the index pin provides a positive stop against sliding movement of the index slide, thus limiting downward movement of the mower deck.

4. The apparatus of claim 3, further comprising counterbalance springs implemented in conjunction with said lift rods so as to reduce the effective weight of the mower deck, thereby reducing the operational forces required for actuation of the first and second pedals.

* * * * *